R. V. LYON.
MEANS FOR RELIEVING STRAIN ON VEHICLE FRAMES.
APPLICATION FILED JUNE 4, 1919.
1,330,484.
Patented Feb. 10, 1920.
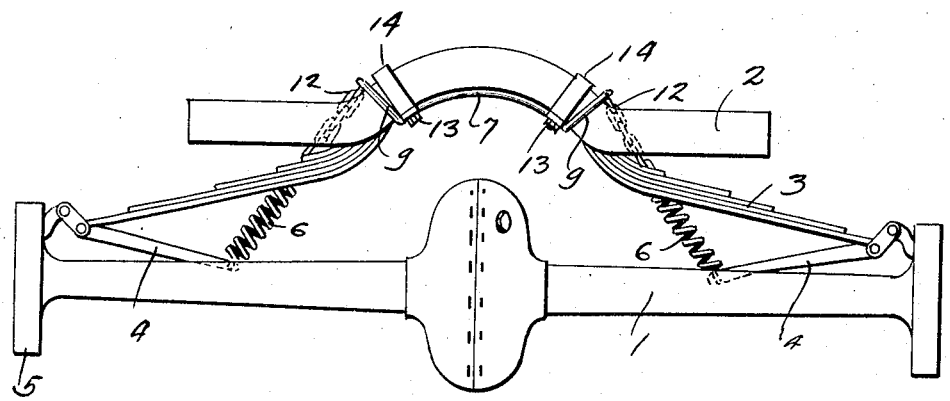
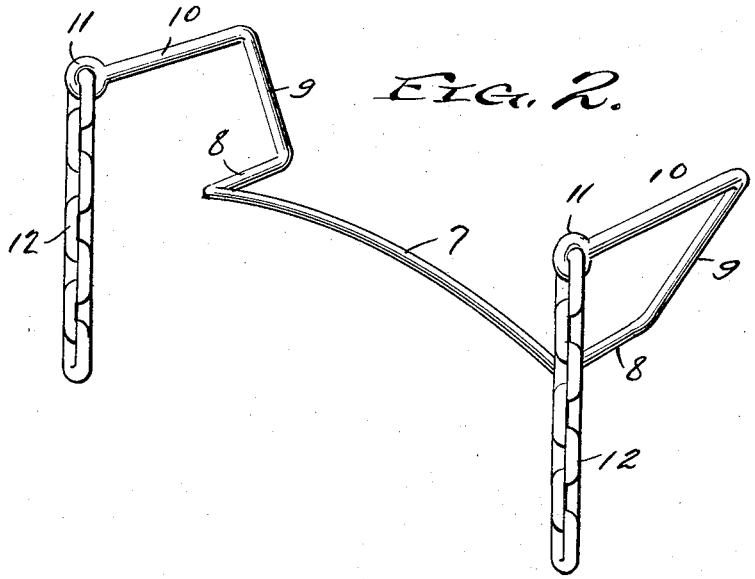
WITNESSES
INVENTOR.
Robert V. Lyon
BY
ATTORNEY.

UNITED STATES PATENT OFFICE.

ROBERT V. LYON, OF DICKINSON, NORTH DAKOTA.

MEANS FOR RELIEVING STRAIN ON VEHICLE-FRAMES.

1,330,484. Specification of Letters Patent. Patented Feb. 10, 1920.

Application filed June 4, 1919. Serial No. 301,636.

*To all whom it may concern:*

Be it known that I, ROBERT V. LYON, a citizen of the United States, residing at Dickinson, in the county of Stark and State of North Dakota, have invented certain new and useful Improvements in Means for Relieving Strain on Vehicle-Frames, of which the following is a specification.

The present invention aims to materially neutralize the strain on the frame or running gear of a vehicle and is designed more particularly for automobiles and motor vehicles and specifically for the type of car designated as the Ford.

The chassis of the Ford when equipped with shock absorbers of the H and D type is subjected to constant and excessive strain which frequently causes fracture of the rear cross member of the frame and it is the purpose of this invention to relieve the strain on the rear cross bar of the frame, thereby prolonging the period of service and enabling the successful use of the H and D shock absorbers.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Referring to the drawing hereto attached,

Figure 1 is a rear view of the main frame, rear axle housing and rear spring of a Ford automobile showing the same equipped with H and D shock absorbers and with means embodying the invention for relieving the strain on the rear cross bar of the frame or chassis.

Fig. 2 is a perspective view of the attachment whereby the strain is relieved.

Corresponding and like parts are referred to in the following description and indicated in both views of the drawing by like reference characters.

In the drawing the numeral 1 designates the rear axle housing of the Ford automobile, 2 the rear cross bar of the main frame or chassis and 3 the rear main leaf spring. The numeral 4 designates the arms or levers of the H and D shock absorbers which are connected with the break drums 5 in a manner well understood. The springs of the shock absorbers are indicated at 6. The foregoing parts are of well known construction and arrangement and are illustrated to demonstrate the application of the present invention which in the form shown is specifically adapted for the parts illustrated.

The device comprises a frame of peculiar formation and embodying a member 7, lateral extensions 8 at the ends of the member 7 projecting in the same direction and in parallel relation, upwardly diverging members 9 at the extremities of the lateral extensions 8 and arms 10 at the extremities of the members 9, the arms 10 being parallel with the lateral extensions 8 and terminating in eyes 11 to which short chains or like connections 12 are attached. These several parts of the frame are formed by bending a rod or bar of suitable gage into the shape substantially as illustrated. The member 7 is upwardly curved to conform to the curvature of the main leaf spring 3. When the device is in position the ends of the member 7 engage behind the nuts 13 which retain the rear ends of the yokes or glands to the clips 14 which hold the spring 3 and frame bar 2 in operative position. The upwardly diverging members 9 extend along the rear side of the cross bar 2 and are disposed exterior to the clips 14. The arms 10 extend over the ends of the curved portion of the rear cross bar 2 thereby enabling the chains or connections 12 to extend downwardly in front of the cross bar 2 and make connection with the spring 6. When the device is in position forward displacement thereof is prevented by the upwardly diverging members 9 and rearward displacement is obviated by the chains 12 engaging the front side of the cross bar 2. and the member 7 having its end portions engaging the rear nuts 13 of the clips 14. It will thus be understood that the frame or chassis of the machine is materially relieved of the strain and is in consequence not so liable to fracture. In the event of either one of the springs 6 breaking the lever or arm 4 to which the broken spring is attached may be jacked up and the end of the spring readily coupled to a link of the chain or connection 12. The construction is such as to admit of repairs being readily and conveniently made on the road when necessary. It will also be understood that the device may be placed in position or removed from the frame without requiring the use of tools and when in position it is not liable to displacement because of the peculiar arrangement and disposition of the parts.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

A device adapted to be applied to a vehicle having a main leaf spring attached at an intermediate point to the body frame and connected at its ends to an axle by means of levers supported at their outer ends by the axle and at their inner ends by means of coil springs, comprising a longitudinal member having terminal lateral extensions adapted to extend under the median part of said main spring, upwardly diverging members at the ends of the lateral extensions disposed behind the rear cross bar of the vehicle frame and forwardly projecting extensions on the ends of said diverging portions overlying the cross bar of the main frame and to which the coil springs holding the inner ends of the levers are adapted to be attached by suitable connections.

In testimony whereof I affix my signature in presence of two witnesses.

ROBERT V. LYON.

Witnesses:
T. A. TOLLEFSON,
G. E. TOLLEFSON.